(12) United States Patent
Berrer

(10) Patent No.: US 11,585,531 B2
(45) Date of Patent: Feb. 21, 2023

(54) METHOD FOR THE CONTINUOUS FIRING OF COMBUSTION CHAMBERS WITH AT LEAST THREE REGENERATIVE BURNERS

(71) Applicant: Hertwich Engineering GmbH, Braunau (AT)

(72) Inventor: Manuel Berrer, Ried im Innkreis (AT)

(73) Assignee: Hertwich Engineering GmbH, Braunau (AT)

( * ) Notice: Subject to any disclaimer, the term of this patent is extended or adjusted under 35 U.S.C. 154(b) by 422 days.

(21) Appl. No.: 16/827,549

(22) Filed: Mar. 23, 2020

(65) Prior Publication Data
US 2020/0326070 A1 Oct. 15, 2020

(30) Foreign Application Priority Data

Apr. 11, 2019 (EP) ..................................... 19168623

(51) Int. Cl.
*F23L 15/02* (2006.01)
*F23N 3/06* (2006.01)
(52) U.S. Cl.
CPC ................ *F23N 3/06* (2013.01); *F23L 15/02* (2013.01); *F23N 2237/02* (2020.01)
(58) Field of Classification Search
CPC .......... F23N 3/06; F23N 2237/02; F23N 1/04; F23N 1/042; F23N 1/045; F23N 1/047;
(Continued)

(56) References Cited

U.S. PATENT DOCUMENTS

| 803,628 | A | * | 11/1905 | Schneider | ............... | F23L 15/02 |
| | | | | | | 251/215 |
| 1,553,242 | A | * | 9/1925 | Isley | ....................... | F23L 15/02 |
| | | | | | | 137/248 |

(Continued)

FOREIGN PATENT DOCUMENTS

| BR | 102016011523 A2 * | 11/2016 | ............... C21B 9/14 |
| CN | 203615341 U | 5/2014 | |

(Continued)

OTHER PUBLICATIONS

English-language espacenet Abstract for CN203615341U, May 28, 2014.

(Continued)

*Primary Examiner* — Steven B McAllister
*Assistant Examiner* — Daniel E. Namay
(74) *Attorney, Agent, or Firm* — Tiajoloff & Kelly LLP

(57) ABSTRACT

A method for continuous firing of combustion chambers with at least three regenerative burners, wherein a first regenerative burner cyclically in the combustion mode conveys supply air and a second regenerative burner in the exhaust mode conveys exhaust air. To avoid escape of hazardous process gases from the combustion chamber into the environment and high carbon monoxide emissions, and to provide energy-efficient firing operation despite use of compact regenerators, the volume flow of the supply or exhaust air through the first or second regenerative burner is reduced continuously and in counter-cycle mode to the volume flow of supply or exhaust air through a third regenerative burner at constant combustion chamber pressure until the first or second regenerative burner is flow-free.

11 Claims, 2 Drawing Sheets

Figure 1:
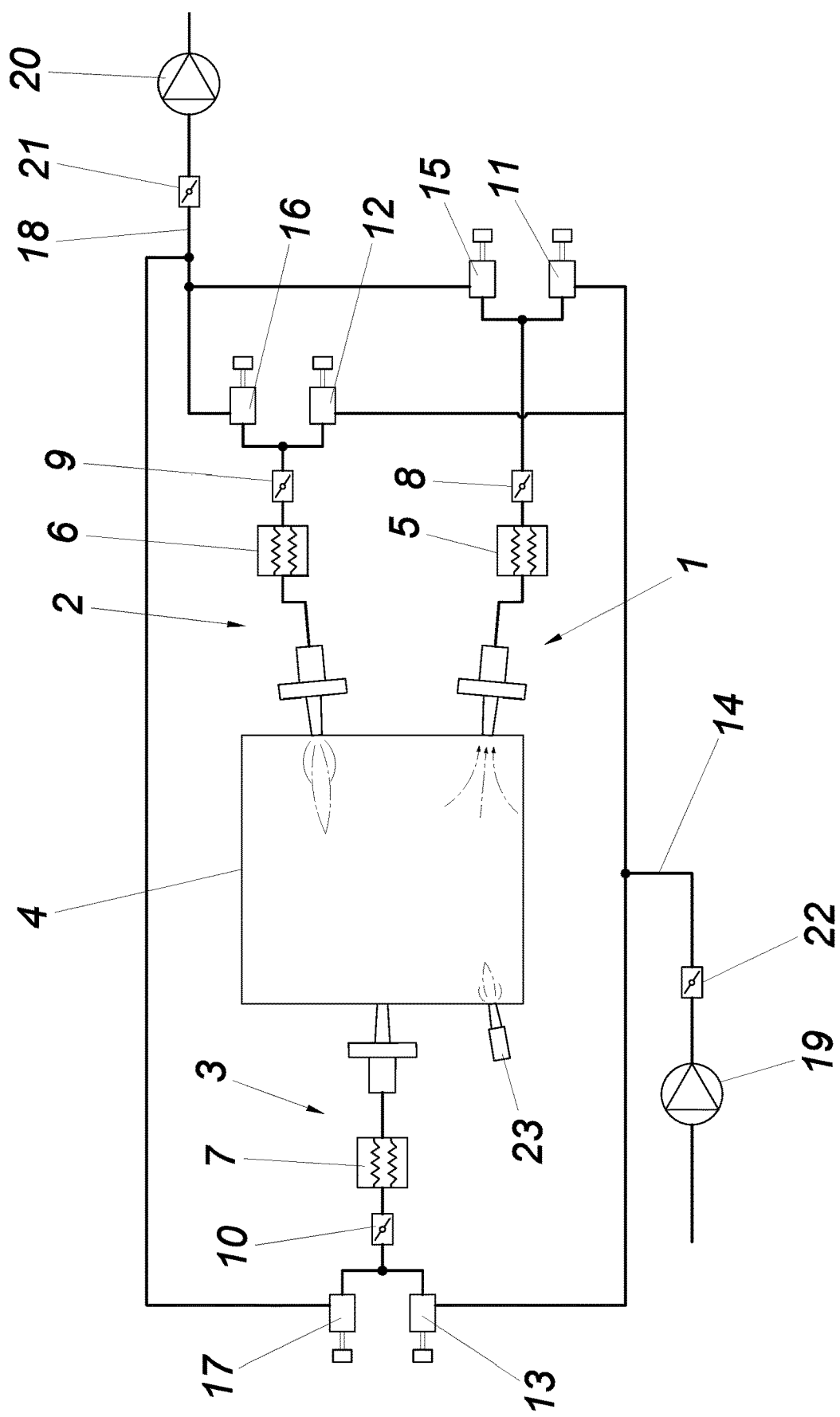

(58) Field of Classification Search
CPC . F23N 1/10; F23N 1/102; F23N 1/105; F23N 1/107; F23N 2221/06; F23N 2221/04; F23L 15/02; F27B 3/263; F27B 3/266; F27B 9/3044; F27B 2014/146; F23C 7/06; F23C 2201/20; F23K 5/20; F23K 2300/204; F23K 2400/00; F23K 2400/10; F23K 2400/20; F23K 2400/201; F23K 2900/01041; F23K 2900/15043
USPC ........ 431/12, 9, 61, 161, 215, 243, 281, 285
See application file for complete search history.

(56) References Cited

U.S. PATENT DOCUMENTS

| | | | | |
|---|---|---|---|---|
| 1,722,701 | A * | 7/1929 | Isley | F23L 15/02 432/54 |
| 2,171,597 | A * | 9/1939 | Parker | C03B 5/237 431/11 |
| 4,599,100 | A * | 7/1986 | Demarest, Jr. | F23C 6/047 65/135.1 |
| 4,856,492 | A * | 8/1989 | Kawamoto | F23L 15/02 428/116 |
| 4,870,947 | A * | 10/1989 | Kawamoto | F23L 15/02 428/116 |
| 4,909,727 | A * | 3/1990 | Khinkis | F27D 99/0033 431/351 |
| 4,923,391 | A * | 5/1990 | Gitman | B05B 7/0861 431/11 |
| 5,538,420 | A * | 7/1996 | Klobucar | F23G 7/068 432/2 |
| 5,571,006 | A * | 11/1996 | Nakamachi | F23L 15/02 431/11 |
| 5,791,299 | A * | 8/1998 | Matsuo | F23L 15/02 122/367.1 |
| 5,876,197 | A * | 3/1999 | Engelberg | F27B 3/263 432/24 |
| 6,113,389 | A * | 9/2000 | Joshi | C03B 5/2353 431/11 |
| 6,126,440 | A * | 10/2000 | Argent | F27B 3/263 432/180 |
| 6,234,789 | B1 * | 5/2001 | Miyata | F23L 15/02 126/91 A |
| 6,250,917 | B1 * | 6/2001 | Engelberg | F27B 3/263 432/179 |
| 6,495,092 | B1 * | 12/2002 | Hazama | F23L 15/02 432/19 |
| 8,690,566 | B2 * | 4/2014 | Zucchelli | C03B 5/235 432/181 |
| 9,611,519 | B2 * | 4/2017 | Buchet | F27B 9/02 |
| 11,261,117 | B2 * | 3/2022 | D'Agostini | F23C 6/045 |
| 2010/0213647 | A1 * | 8/2010 | Buchet | F27D 13/00 266/44 |
| 2010/0291493 | A1 * | 11/2010 | Jarry | G01N 25/18 431/12 |
| 2012/0021367 | A1 * | 1/2012 | Zucchelli | C03B 5/237 432/25 |
| 2013/0011805 | A1 * | 1/2013 | Ward | C03B 5/235 432/13 |
| 2015/0308685 | A1 * | 10/2015 | Iyoha | F27D 17/004 431/11 |
| 2016/0161119 | A1 * | 6/2016 | Jang | F27D 21/0014 432/39 |
| 2016/0230991 | A1 | 8/2016 | Zhou | |
| 2020/0326070 | A1 * | 10/2020 | Berrer | F23L 15/02 |
| 2021/0122659 | A1 * | 4/2021 | D'Agostini | C03B 5/24 |

FOREIGN PATENT DOCUMENTS

| | | | | |
|---|---|---|---|---|
| CN | 104457302 A | * | 3/2015 | ............ F23D 23/00 |
| DE | 19708550 A1 | * | 10/1997 | ............ F27B 3/263 |
| EP | 1717210 A1 | | 11/2006 | |
| JP | 01019216 A | * | 1/1989 | ............ F23C 6/042 |
| JP | 06272851 A | * | 9/1994 | ............ F23L 15/02 |
| JP | 10026483 A | * | 1/1998 | ............ F27B 3/263 |
| JP | 11094239 A | * | 4/1999 | ............ F23C 5/08 |
| JP | 2001065859 A | * | 3/2001 | ............ F23L 15/02 |
| JP | 2018028394 A | * | 2/2018 | ............ F23C 99/00 |
| KR | 101386053 B1 | * | 4/2014 | ............ F23N 5/022 |
| SE | 1150445 A1 | * | 2/2012 | ............ F23L 15/02 |
| WO | WO-9917060 A1 | * | 4/1999 | ............ F23C 5/08 |

OTHER PUBLICATIONS

English-language espacenet Abstract for EP1717210A1, Nov. 2, 2006.

* cited by examiner

METHOD FOR THE CONTINUOUS FIRING OF COMBUSTION CHAMBERS WITH AT LEAST THREE REGENERATIVE BURNERS

The invention relates to a method for the continuous firing of combustion chambers with at least three regenerative burners, wherein a first of the regenerative burners is cyclically first in the combustion mode carrying supply air and a second of the regenerative burners is in the exhaust mode carrying exhaust air.

From the prior art, methods for firing combustion chambers in industrial furnaces with two regenerative burners are known. In this process, the respective regenerator of one regenerative burner is alternately heated up with the hot process exhaust gas produced in the combustion chamber during the combustion process and extracted by the regenerative burner, while the regenerator of the other regenerative burner heats the supply air supplied to it and thereby cools itself down. During the changeover process between the regenerative burners, the supply and exhaust air flows are interchanged, resulting in a brief interruption of the combustion process and, as a result, a drop in pressure and even a formation of negative pressure in the combustion chamber. If there is a negative pressure in the combustion chamber compared to the ambient pressure, there is the problem that additional false air is sucked into the combustion chamber, which reduces the energy efficiency of the furnace due to the false air not being preheated by the exhaust air. In addition, the controlled supply of combustion air to the combustion chamber is stopped during the changeover processes, so that the low-temperature carbonization gases that regularly form during the combustion of contaminated scrap cannot be completely and controllably burned due to the then substoichiometric oxygen content of the combustion air, which leads to the formation of carbon monoxide. Another disadvantage is that after switching between two regenerative burners, a new ignition process is necessary, which means that there is a risk that the pollutants formed during the combustion process will escape from the combustion chamber into the environment due to the pressure peaks that temporarily occur during the ignition process.

In addition, the changeover process has a negative effect on the energy efficiency or the effectiveness of such devices, especially since relatively long settling times are required after the changeover in addition to a temporary stop of combustion. Against this background, massive regenerator designs with a high thermal mass are required in order to delay the changeover times of such devices as long as possible.

Methods and devices for firing combustion chambers with at least three regenerative burners are known from US 20160230991 A1. The firing process is carried out in such a way that at all times the number of regenerative burners that extract waste gas is higher than the number of regenerative burners that supply the combustion air. In this process, proportional valves are used on the hot gas side, while discrete shut-off valves are installed upstream of the respective regenerators on the cold gas side, which are not suitable for flow control of the occurring volume flows. Apart from the fact that the proportional valves used are arranged on the hot gas side and are therefore exposed to high temperatures and thus high wear, pressure fluctuations occur during the changeover processes, which is why energy-efficient operation is not possible due to the changeover time and the high settling times.

In addition, methods using rotating rotary bed generators have already been proposed to enable continuous firing of industrial furnaces. However, the disadvantage of this is that the moving mechanical parts of the regenerator bed of such rotary bed regenerators are directly exposed to very high temperatures of over 1000° C., which on the one hand places high demands on the materials used and on the other hand makes it difficult to achieve a permanent and effective seal between the combustion air and exhaust gas areas of the regenerative burner.

The invention is thus based on the object of providing a method of the type described above, in which the escape of process gases hazardous to health from the combustion chamber into the immediate environment as well as high carbon monoxide emissions are avoided and, despite the use of compactly dimensioned regenerators, energy-efficient firing operation is made possible.

The invention solves the set object by reducing the volume flow of the supply or exhaust air through the first or second regenerative burner continuously and in countercurrent to the volume flow of the supply or exhaust air through the third regenerative burner at a constant combustion chamber pressure for such a time until the first or second regenerative burner is flow-free.

The features according to the invention effectively prevent the supply of additional false air due to a combustion chamber vacuum and the escape of toxic process gases into the immediate combustion chamber environment due to a combustion chamber overpressure, because a changeover process between the regenerative burners, which involves a combustion stop and a subsequent re-ignition process, is not necessary and thus the combustion chamber pressure is not subject to large pressure fluctuations. A constant combustion chamber pressure can only be achieved if the volume flows of supply and exhaust air can be regulated at any time during the operating cycle. According to the invention, the volume flow of the supply or exhaust air of the first regenerative burner can be continuously reduced in counter-cycle mode to the third regenerative burner in such a way that the increase in the volume flow of the supply or exhaust air of the third regenerative burner takes place in the same ratio as the volume flow reduction of the first regenerative burner. Because the volume flow of the first and third regenerative burners operating in combustion or extraction mode remains unchanged during the change in volume flow of the second regenerative burner operating in the counter-cycle mode, a continuous supply of combustion air and a continuous extraction of exhaust air can take place while maintaining a constant total flow rate of both the supply and exhaust air flows. Since this means that there is a volume flow of both supply and exhaust air at any time, the combustion chamber pressure can be regulated, for example, by the total volume flow of exhaust air and/or supply air at any time during the operating cycle. Due to the advantageous and fast responding pressure regulating behavior, the operating cycles can be chosen shorter compared to the prior art, wherein the applied regenerators of the regenerative burners have a lower thermal mass and can be built more compact. In this context, favorable operating conditions arise when the combustion chamber pressure level is provided close to ambient pressure. In the sense of the invention, supply air means the fresh or ambient air supplied to the combustion chamber in a controlled manner, while exhaust air means the exhaust gas, i.e. the gas-air mixture produced during the combustion process together with atmospheric nitrogen and residual oxygen.

A device with at least three regenerative burners, the regenerators of which are flow-connected on the hot gas side to the combustion chamber and can each be connected alternately to a supply air line and an exhaust air line via a valve on the cold gas side, is also described for carrying out a method according to the invention. In order to enable a good control behavior of the combustion chamber pressure in this context and to reduce the thermally induced wear of actuators for continuous flow control of volume flows of the supply and exhaust air, it is proposed that the cold-gas-side valves are designed as proportional valves, at least two of which can be actuated in counter-cycle mode to form a closed combustion chamber pressure regulating circuit. As a result of these features, the moving mechanical parts of the proportional valves acting as actuators, which may be designed as regulating flaps, for example, are prevented from coming into contact with the hot exhaust air from the combustion chamber, because it is ensured that the exhaust air transfers its heat to the regenerator upstream of the control valve on the hot gas side before the already cooled exhaust air hits the proportional valve. In general, however, a proportional valve can be understood as any controllable valve that allows a continuous transition of its switching positions for regulating the flow. The closed combustion chamber pressure regulating circuit enables efficient regulation of the combustion chamber pressure via the total volume flow of the exhaust and/or supply air by means of the proportional valves which can be controlled in counter-cycle mode. For example, each regenerator can be flow-connected to the supply and exhaust air lines via a proportional valve on the cold gas side.

At the start of an operating cycle, for example, the first of the regenerative burners is initially in exhaust air extraction mode, the second regenerative burner in supply air burning mode and the third regenerative burner in flow-free idle mode. The respective cold-gas-side proportional valves of the first and the third regenerative burner are actuated in counter-cycle mode in such a way that the exhaust air volume flow of the first regenerative burner decreases continuously in the same ratio due to the continuous closing movement of its cold-gas-side proportional valve as the exhaust air volume flow of the previously flow-free third regenerative burner increases as a result of the continuous opening movement of its cold-gas-side proportional valve, while the position of the cold-gas-side proportional valve of the second regenerative burner does not have to be changed and therefore its supply air volume flow remains unchanged. The operating cycle can be continued, for example, by continuously transferring the supply air volume flow of the second regenerative burner operating in burning mode into the supply air volume flow of the first regenerative burner, which has been flow-free in the meantime, in a similar way to the preceding exhaust air volume flow exchange between the first and third regenerative burner, while the exhaust air volume flow of the third regenerative burner remains unchanged.

In order to ensure low-wear operation under favorable operating conditions and thus longer maintenance intervals for the device, the proportional valves on the cold gas side can be flow-connected to the supply and exhaust air lines via one gate valve each. The use of robust gate valves as discrete on/off valves, as opposed to proportional valves, makes it possible in a device with, for example, three regenerative burners to provide only three proportional valves for flow regulation instead of at least six, while the alternate connection of the respective regenerators to the supply and exhaust lines can then be made through the gate valves.

Particularly advantageous design and control engineering conditions arise if the supply and/or exhaust air line has a summation proportional valve to regulate the total air flow. This enables the combustion chamber pressure to be regulated by means of a single global summation proportional valve assigned to each of the supply and/or exhaust air lines. The summation proportional valve, for example, designed as an additional regulating flap, can be installed downstream of a supply air and/or exhaust air device in the direction of the regenerative burners.

Figure 2:
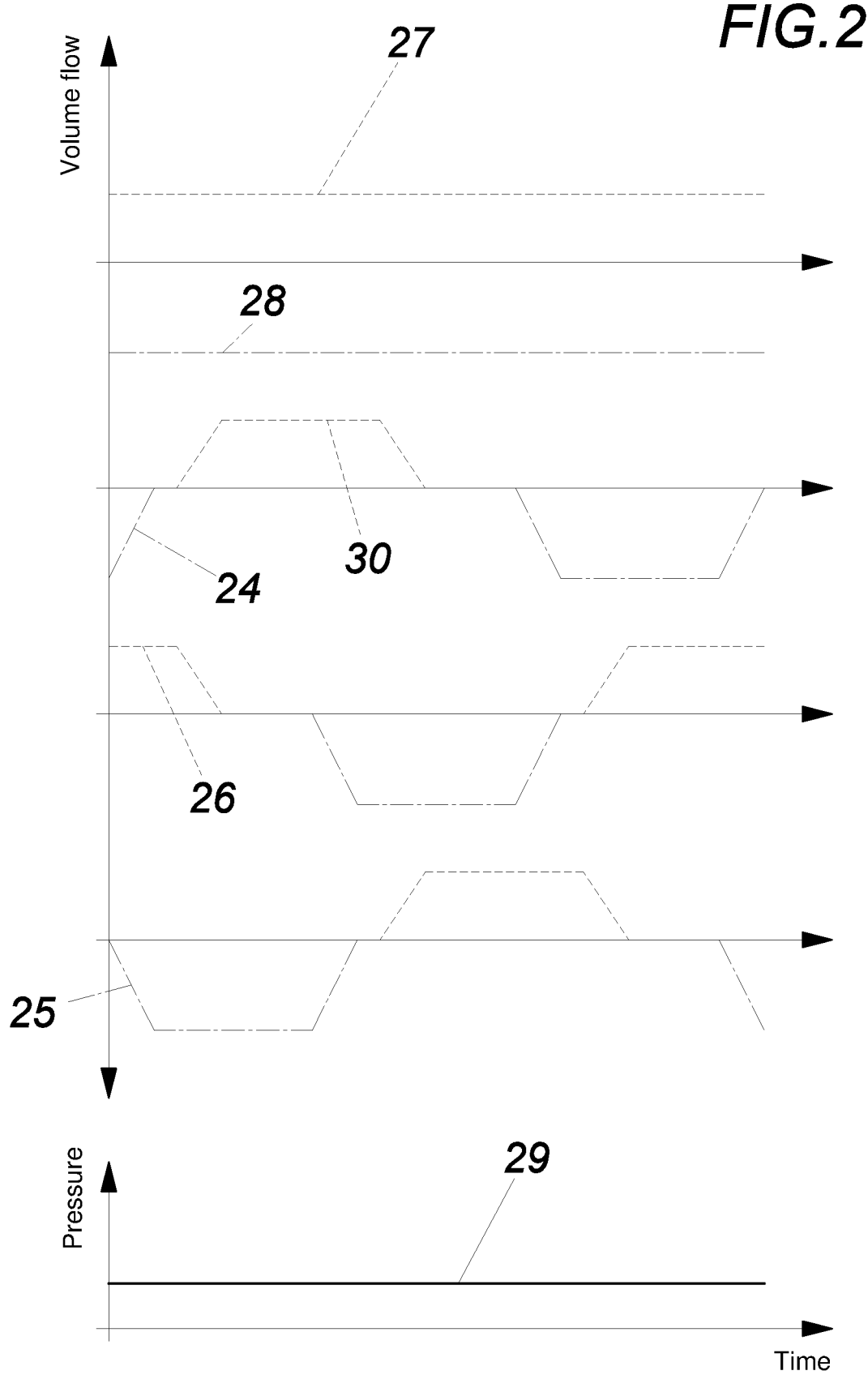

The drawing shows the subject matter of the invention by way of example, wherein:

FIG. 1 shows a schematic circuit diagram of a device according to the invention, and FIG. 2 shows the total volume flow over time, the partial volume flows over time and the total pressure over time of a combustion chamber of a device in accordance with the invention for an operating cycle section of a method in accordance with the invention.

A device according to the invention has three regenerative burners 1, 2, 3 for firing a combustion chamber 4. The regenerative burners 1, 2, 3 each have regenerators 5, 6, 7 flow-connected to the combustion chamber 4 on the hot gas side. The regenerators 5, 6, 7 are each preceded by proportional valves 8, 9, 10 on the cold gas side in the direction of the combustion chamber 4 in the form of regulating flaps, which are flow-connected to an air supply line 14 via one gate valve 11, 12, 13 each and to an exhaust air line 18 via one gate valve 15, 16, 17 each.

The supply of combustion air, which can be conducted for combustion operation via the supply air line 14 to the regenerators 5, 6, 7 and heated by them, is carried out via a supply air device 19. The exhaust air is extracted by suction via an exhaust air device 20.

The proportional valves 8, 9, 10 can be actuated in pairs in counter-cycle mode, forming a closed regulating circuit for pressure regulation of the combustion chamber 4. The pressure of combustion chamber 4 is regulated, for example, by means of a summation proportional valve 21 downstream of the exhaust air device 20 in the direction of combustion chamber 4, for example, in the form of a regulating flap. For a better regulating behavior, a summation proportional valve 22 downstream in the direction of combustion chamber 4 can also be used additionally. In order to heat up combustion chamber 4 in a controlled manner to the ignition temperature of the fuel gas of approx. 750° C. during initial start-up before the regenerative burners 1, 2, 3 are switched on, an additional auxiliary burner 23, which opens into combustion chamber 4 and is designed as a cold air burner, for example, can be provided.

In FIG. 2, the temporal volume flow curves of the regenerative burners 1, 2, 3 as well as the temporal combustion chamber pressure curve of a device according to the invention during an operating cycle section of a method according to the invention are shown as examples.

For example, the regenerative burner 1 initially operates in exhaust air extraction mode, the regenerative burner 2 in supply air burning mode and the regenerative burner 3 in flow-free idle mode. The respective cold-gas-side proportional valves 8, 10 of the regenerative burners 1, 3 are actuated in counter-cycle mode in such a way that the exhaust air volume flow 24 of the regenerative burner 1 decreases continuously in the same ratio due to the continuous closing movement of the proportional valve 8 as the exhaust air volume flow 25 of the previously flow-free regenerative burner 3 increases due to the continuous opening movement of the proportional valve 10, while the proportional valve 9 is not actuated and thus the supply air volume flow 26 of the regenerative burner 2 and thus also the total supply air flow 27 remains unchanged. The proportional valve 10 is then opened so that the exhaust air volume flow 25 has reached the previous level of the exhaust air volume flow 24 while maintaining a constant total exhaust air flow 28 and a constant combustion chamber pressure 29, while the proportional valve 8 is closed and thus the exhaust air volume flow 24 is shut off. The total exhaust air flow 28 can be higher than the total supply air flow 27 during the entire operating cycle.

In order to continue the operating cycle, the connection of the now flow-free regenerative burner 1 to the exhaust air line 18 can first be closed via the gate valve 15 and the connection to the supply air line 14 can be opened via the gate valve 11. In the next step, the regenerative burner 2 operating in burning mode can be continuously transferred to the supply air volume flow 30 of the regenerative burner 1 by means of the proportional valves 8, 9 in a manner analogous to the preceding exhaust air volume flow exchange between the regenerative burners 1, 3, while the exhaust air volume flow 25 of the regenerative burner 3 remains unchanged. The further steps of the operating cycle section shown in FIG. 2 by way of example can be continued in the same way.

What is claimed is:

1. A method for continuous firing of a combustion chamber with at least three regenerative burners, said method comprising:
    carrying supply air cyclically through a first of the regenerative burners in a combustion mode thereof; and
    carrying exhaust air cyclically through a second of the regenerative burners in an exhaust mode thereof; and
    reducing volume flow of the supply air or exhaust air through the first or second of the regenerative burners continuously and in counter-cycle to increasing volume flow of the supply or exhaust air through a third of the regenerative burners;
    wherein said reducing of the volume flow of the supply or exhaust air is such that, during said reducing, the combustion chamber has a constant combustion chamber pressure until the volume flow of the regenerative burner the volume flow of which is being reduced has no volume flow.

2. A method according to claim 1, wherein the method further comprises
    activating proportional valves on cold gas sides of at least two of the regenerative burners in counter-cycle so as to increase volume flow continuously in one of the regenerative burners and reduce in counter-cycle volume flow in another of the regenerative burners when said regenerative burners are both in the combustion mode or are both in the exhaust mode, wherein the valves operate as a closed combustion chamber pressure regulating circuit that maintains the constant pressure in the combustion chamber.

3. A method according to claim 2, wherein the proportional valves on the cold gas sides each communicate with the supply air line and the exhaust air line via a respective gate valve.

4. A device comprising:
    at least three regenerative burners each having regenerators that each communicate on a respective hot-gas side thereof with a combustion chamber and are each connected via a respective valve on a cold-gas side thereof in an alternating manner to a supply air line and an exhaust air line;
    wherein supply air flows from the supply air line through the regenerative burner when in a combustion mode; and
    wherein exhaust air flows through the exhaust air line and through the regenerative burner when in an exhaust mode;
    wherein the valves on the cold gas side are proportional valves, at least two of which are actuated in counter-cycle so as to increase volume flow continuously in one of the regenerative burners and reduce in counter-cycle volume flow in another of the regenerative burners when said regenerative burners are both in the combustion mode or are both in the exhaust mode; and
    wherein the proportional valves maintain a constant pressure in the combustion chamber operating as a closed combustion chamber pressure regulating circuit.

5. A device according to claim 4, wherein the proportional valves on the cold gas side are each connected to the supply air line and the exhaust air line via a respective gate valve.

6. A device, comprising:
    at least three regenerative burners each having regenerators that each communicate on a respective hot-gas side thereof with a combustion chamber and are each connected via a respective valve on a cold-gas side thereof in an alternating manner to a supply air line and an exhaust air line, wherein supply air flows from the supply air line through the regenerative burner when in a combustion mode, and wherein exhaust air flows through the exhaust air line to which and through the regenerative burner when in an exhaust mode;
    wherein the valves on the cold gas side are proportional valves, at least two of which are actuated in counter-cycle so as to increase volume flow continuously in one of the regenerative burners and reduce in counter-cycle volume flow in another of the regenerative burners when said regenerative burners are both in the combustion mode or are both in the exhaust mode, and the valves operate as a closed combustion chamber pressure regulating circuit that maintains a constant pressure in the combustion chamber; and
    wherein the supply air line or the exhaust air line or both have a summation proportional valve regulating the volume flow of total air flow in the device.

7. A device according to claim 6, wherein the proportional valves on the cold gas side are each connected to the supply air line and the exhaust air line via a respective gate valve.

8. A method for continuous firing of a combustion chamber with at least three regenerative burners, said method comprising:
    carrying supply air cyclically through a first of the regenerative burners in a combustion mode thereof; and
    carrying exhaust air cyclically through a second of the regenerative burners in an exhaust mode thereof; and
    reducing volume flow of the supply or exhaust air through the first or second of the regenerative burners continuously and in counter-cycle to increasing volume flow of the supply or exhaust air through a third of the regenerative burners at a constant combustion chamber pressure until the first or second regenerative burner has no volume flow;
    activating proportional valves on cold gas sides of at least two of the regenerative burners in counter-cycle so as to increase volume flow continuously in one of the regenerative burners and reduce in counter-cycle volume flow in another of the regenerative burners when said regenerative burners are both in the combustion mode or are both in the exhaust mode, wherein the valves operate as a closed combustion chamber pressure regulating circuit that maintains a constant pressure in the combustion chamber; and regulating total air flow using a summation proportional valve in the supply air line or in the exhaust air line.

9. A method for continuous firing of a combustion chamber with at least three regenerative burners each having varying volume flow of supply air or exhaust air therethrough, said method comprising:

supplying supply air to the regenerative burners;

causing each of the regenerative burners to cyclically go through a combustion mode wherein supply air flows therethrough and an exhaust mode wherein exhaust gas flows therethrough, said regenerative burners being in the combustion and exhaust modes at different time intervals relative to each other, said time intervals each having a beginning and an end;

reducing the volume flow of exhaust air flowing through one of the regenerative burners at the end of a time interval of the exhaust mode thereof continuously until said volume flow reaches zero; and increasing the volume flow of the exhaust air through another of the regenerative burners at the beginning of an exhaust mode thereof that is in counter-cycle to said reducing; and said reducing and increasing of the volume flows being controlled such that a constant pressure in the combustion chamber is maintained.

10. A method according to claim 9, and further comprising reducing, for one of the regenerative burners at an end of a time interval of the combustion mode, the volume flow of supply air flowing therethrough continuously until said volume flow reaches zero, and increasing the volume flow of the supply air through the respective other of the regenerative burners at a beginning of a combustion mode thereof in counter-cycle to said reducing so as to maintain the constant pressure in the combustion chamber.

11. A method according to claim 9, and further comprising activating proportional valves on cold gas sides of at least two of the regenerative burners in counter-cycle so as to increase volume flow continuously in one of the regenerative burners and reduce in counter-cycle volume flow in another of the regenerative burners when said regenerative burners are both in the combustion mode or are both in the exhaust mode, wherein the valves operate as a closed combustion chamber pressure regulating circuit that maintains the constant pressure in the combustion chamber.

* * * * *